United States Patent [19]

Dreyer et al.

[11] Patent Number: 4,474,205

[45] Date of Patent: Oct. 2, 1984

[54] SLIDING BLADE APPARATUS FOR CLOSING CONDUITS

[75] Inventors: Paul L. Dreyer, Allentown; William R. McLennan, Easton; Kenneth I. Conley, Northampton, all of Pa.

[73] Assignee: Ecolaire Incorporated, Malvern, Pa.

[21] Appl. No.: 591,587

[22] Filed: Mar. 20, 1984

[51] Int. Cl.³ .................... F16K 43/00; F16K 3/20
[52] U.S. Cl. .................... 137/315; 137/454.2; 137/559; 126/285 A; 251/159; 251/172; 251/327; 251/328; 138/94.3
[58] Field of Search .................... 137/240, 315, 454.2, 137/559; 138/94.3; 251/159, 172, 327, 328; 126/285 A

[56] References Cited

U.S. PATENT DOCUMENTS

| | | | |
|---|---|---|---|
| 1,476,344 | 12/1923 | McGee et al. | 126/285 A |
| 3,228,389 | 1/1966 | Lowe et al. | 251/172 |
| 3,371,493 | 3/1968 | Woolley | 251/172 |
| 3,474,818 | 10/1969 | Hartman | 137/315 |
| 4,022,241 | 5/1977 | Fox | 251/328 |
| 4,093,245 | 6/1978 | Connor | 126/285 A |
| 4,163,458 | 8/1979 | Bachman | 251/172 |
| 4,176,673 | 12/1979 | Connor | 137/240 |

Primary Examiner—George L. Walton
Attorney, Agent, or Firm—Sutherland, Asbill & Brennan

[57] ABSTRACT

A conduit closure apparatus comprising a main frame adapted for connection to a conduit in a position generally in registry with the conduit, a movable blade slidably mounted in the frame, means for moving the blade back and forth between an open position in which the blade is outside the conduit and a closed position in which the blade blocks the conduit, a slot-like port through which the blade slides when it is moved between its open and closed positions, and an inflatable sealing ring that is operable, when inflated, to press against the face of the blade at the blade's periphery when the blade is in the closed position, thereby creating a seal between the blade and the frame, is improved by having the main frame define a channel which holds the edges of the blade when in the closed position, and having the inflatable ring being carried by a second frame, smaller than the main frame, which slidably fits in the channel of the main frane and which can be withdrawn from the main frame through the blade port for easy, relatively fast inspection, repair, or replacement of the inflatable ring, without disconnecting the main frame from the conduit and without need for entering the conduit.

12 Claims, 9 Drawing Figures

SLIDING BLADE APPARATUS FOR CLOSING CONDUITS

This invention concerns apparatus for closing conduits, e.g., dampers or sluice gates. In particular, it concerns such apparatus as have a sliding blade as the closure member and an inflatable ring to seal around the periphery of the blade.

Conduit closure apparatus that use a sliding blade as the closure member are well known. Such an apparatus will often include a frame adapted for connection to a conduit in a position generally in registry with the conduit, a movable blade slidably mounted in the frame, and means for moving the blade back and forth between an open position in which the blade is outside the conduit and a closed position in which the blade blocks the conduit. There also will be an opening in the frame, a slot-like port, through which the blade slides when it is moved between its open and closed positions. To provide an especially tight seal when the blade is in the closed position, it is known that an inflatable ring can be provided which is operable, when inflated, to press against the face of the blade, around the blade's periphery, when the blade is in the closed position, thereby creating a seal between the blade and the frame. See, for example, U.S. Pat. No. 4,163,458 to Bachmann and U.S. Pat. No. 1,476,344 to McGee et al.

The closure apparatus just described are effective for their intended purpose, but they are expensive to service. Invariably, the inflatable ring has to be repaired or replaced from time to time. Often that requires either disconnecting and removing the entire apparatus from the conduit, or sending workers inside the conduit to get to the sealing ring. Both are costly and time-consuming procedures. Furthermore, it can require special equipment—a crane, for example—to handle the apparatus, for example to separate it from the conduit after disconnection.

We have invented an improved form of this type of conduit closure apparatus which overcomes these problems formerly encountered when servicing the sealing ring. In our apparatus the main frame defines a channel which holds the edges of the blade when in the closed position. The inflatable ring is carried by a second frame, smaller than the first, which slidably fits in the channel of the main frame, alongside the blade. The smaller frame (still carrying the inflatable ring) can be withdrawn from the main frame through the blade port without disconnecting the main frame from the conduit. The sealing ring can be inspected, repaired, or replaced outside the conduit, and the entire unit—smaller frame with sealing ring attached thereto—then can be slid back into place inside the main frame, whereupon the apparatus is ready for another period of service.

Preferably, the apparatus of the present invention includes means for releasably tying the smaller frame to the blade, so as to enable the smaller frame to be withdrawn from the main frame merely by moving the blade to the open position, as well as to enable it to be inserted in the main frame by moving the blade to the closed position.

Once the smaller frame is fully inserted in the main frame of the closure apparatus of the present invention, it will normally be preferred to fasten the two frames together. For this purpose the apparatus may advantageously include means that are controllable from outside the conduit for releasably fastening the smaller frame to the main frame. Preferably, such fastening means will be operable to create a fluid-tight seal between the two frames.

The drawings accompanying this specification depict a sliding gate damper for use in a power plant flue gas conduit, which embodies the present invention. The damper is useful, for example, to control a conduit leading to a flue gas scrubber. Referring to the drawings—

In FIGS. 3 and 4 the sealing ring is deflated and thus not visible.

Figure 1:
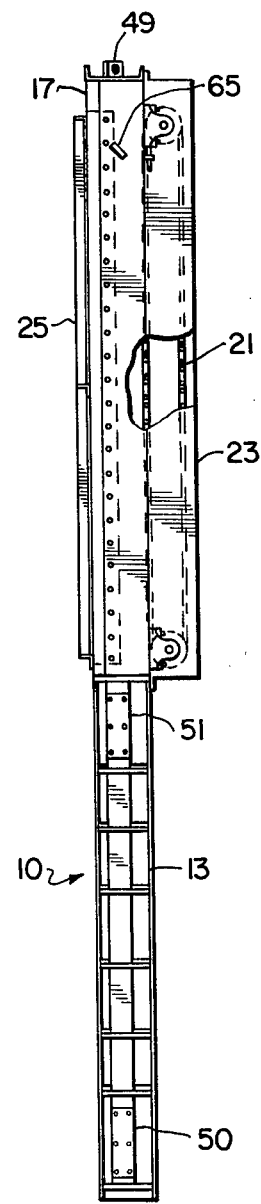
FIG. 1 is a side view, partially broken away, of the damper, devoid of the blade and the smaller frame which carries the inflatable ring.

The apparatus shown in the drawings is constructed around a main frame 10, which has three channel members, 11, 12, and 13, and an upper horizontal member 14 in which there is a slot-like opening 15 (see FIG. 7) through which blade 16 moves during opening and closing of the damper. Main frame 10 is adapted to be drilled and bolted to a conduit (not shown) through the flanged edges of members 11, 12, 13, and 14.

Main frame 10 is strengthened by a pair of upright tubes 42 that are welded to channel members 12 and 14. Tubes 42 also help guide blade 16. Guide members 43, welded to bottom channel member 12, help to assure that blade 16 is properly seated when in the closed position.

Mounted on top of main frame 10 is superstructure 17, which contains lower sprockets 18 and upper sprockets 19 and drive chains 20 and 21, which are attached to blade 16 for raising and lowering the blade. The means of attachment of blade 16 to drive chains 20 and 21 is not shown in the drawings. Suitable means are well known, however.

Figure 2:
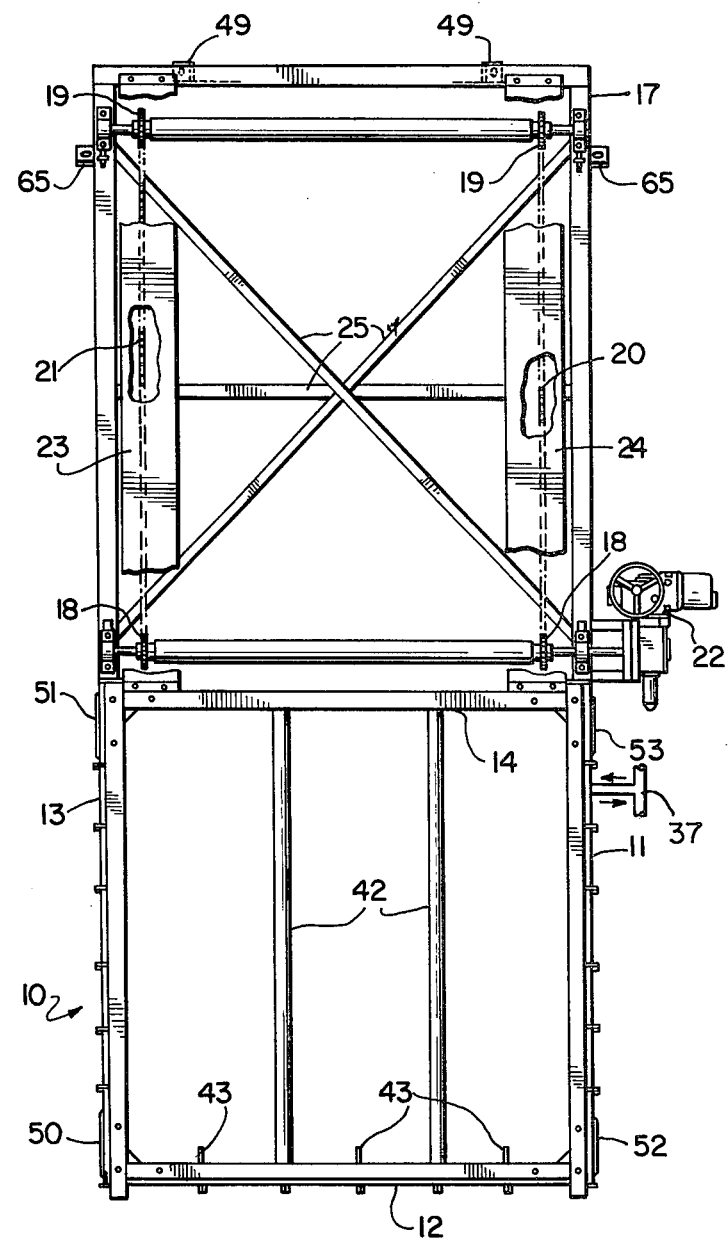
FIG. 2 is a front elevational view, also partially broken away, of the device shown in FIG. 1.
Figure 3:
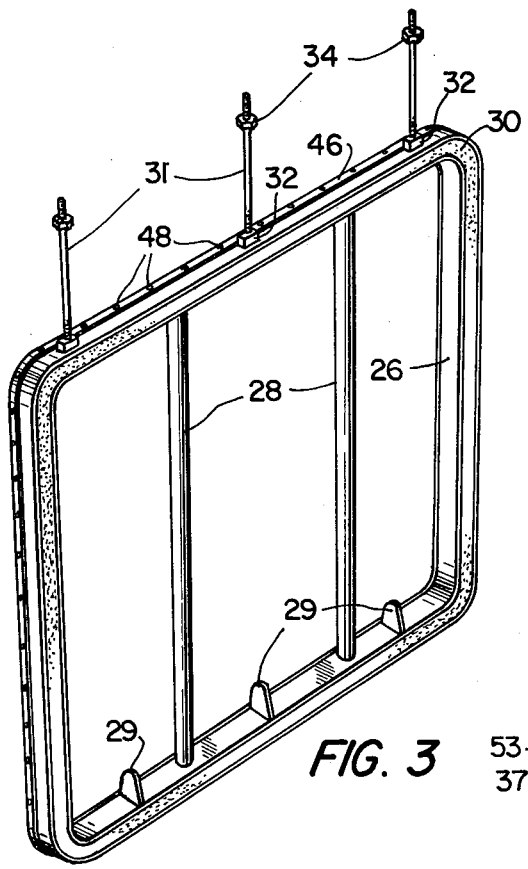
FIG. 3 is a rear perspective view of the smaller frame (carrying the inflatable sealing ring) that is designed to slide inside the main frame of the apparatus depicted in FIGS. 1 and 2.
Figure 4:
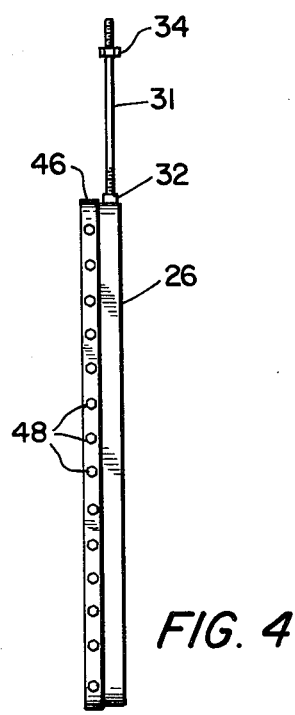
FIG. 4 is a side view of the smaller frame depicted in FIG. 3.
Figure 6:
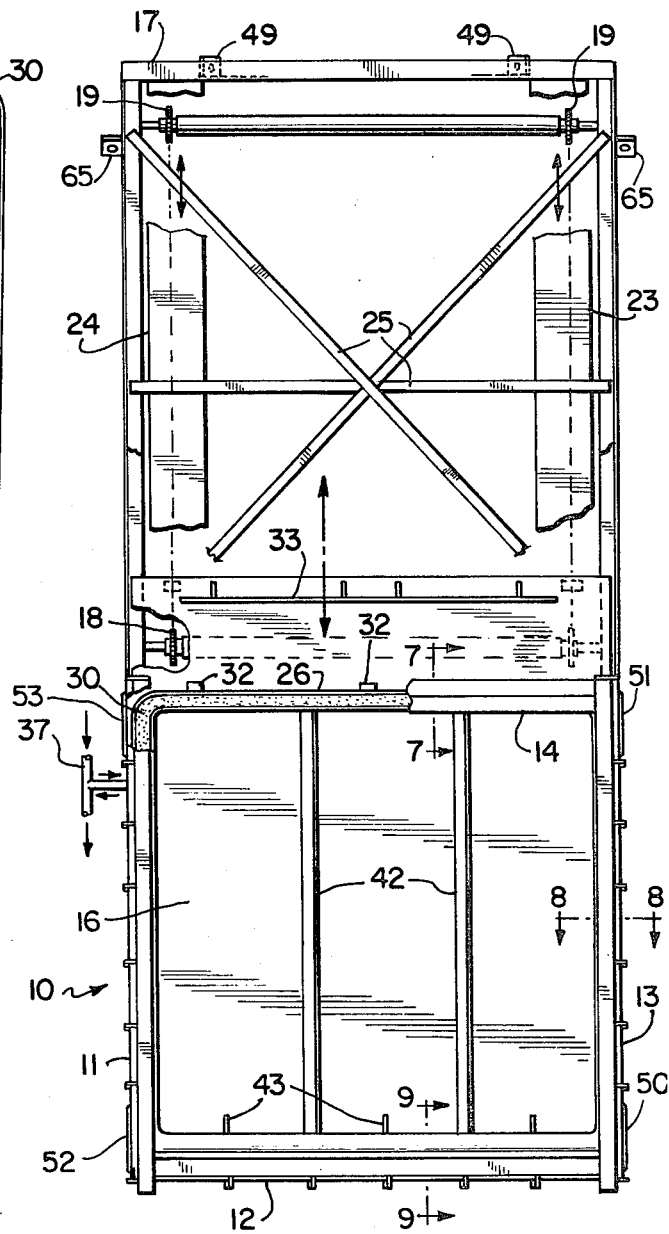
FIG. 6 is a rear elevational view, partially broken away, of the apparatus depicted in FIG. 5, but with the smaller frame fully inserted therein, and the blade in the closed position.
Figure 5:
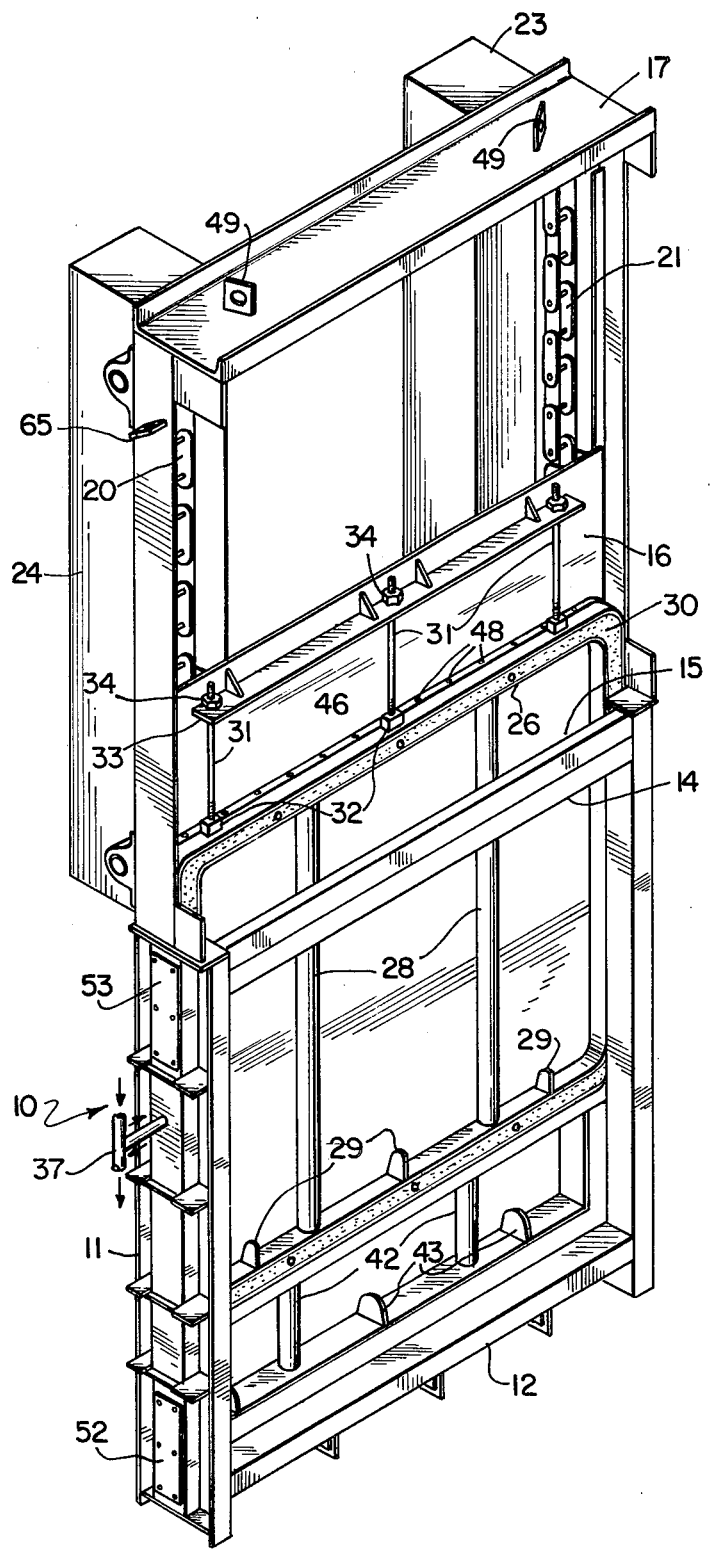
FIG. 5 is a rear perspective view of the damper depicted in FIGS. 1 and 2, but now including the blade and showing the smaller frame (depicted in FIGS. 3 and 4) partially inserted in the main frame.

A drive mechanism 22, for turning lower sprocket 18, is shown in FIG. 2; but, for purposes of simplification, it has been omitted from FIGS. 5 and 6. Housings 23 and 24 are carried by superstructure 17 to guard sprockets 18 and 19 and drive chains 20 and 21. Superstructure 17 is braced by stretcher members 25, as required. (In FIG.

5 stretcher members 25 have been omitted for the sake of clarity.) Welded to superstructure 17 is a first pair of lifting lugs 49, on the top, and a second pair 65, on the sides, which enable the damper to be hoisted by a crane during installation.

Figure 7:
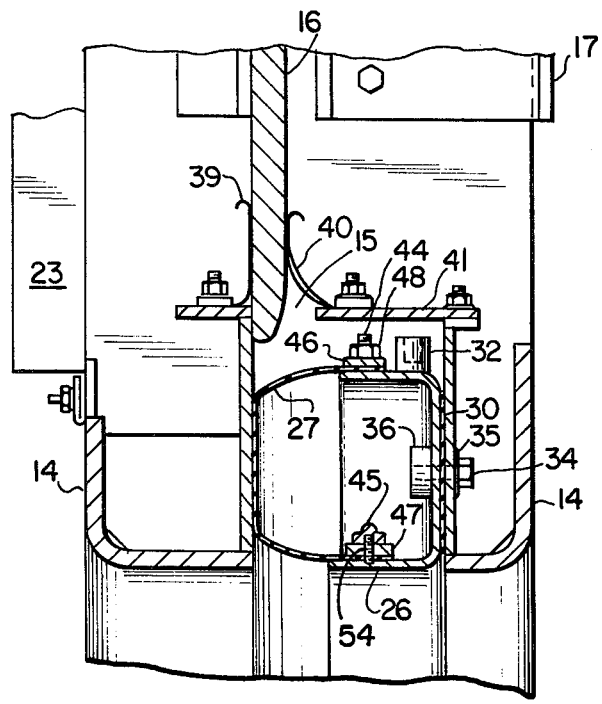
FIG. 7 is an enlarged cross-sectional view, along the line 7—7, of the upper horizontal members of the main and small frames of the apparatus depicted in FIG. 6, but with the blade in the open position. The sealing ring is shown inflated in FIG. 7.
Figure 8:
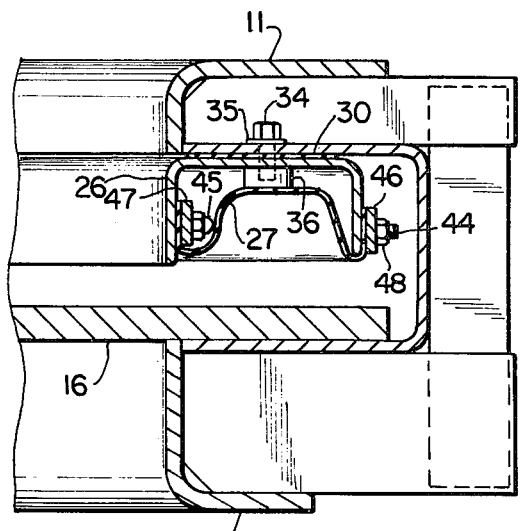
FIG. 8 is an enlarged cross-sectional view, along the line 8—8, of one pair of the vertical members of the main and small frames of the apparatus depicted in FIG. 6, but with the sealing ring deflated.
Figure 9:
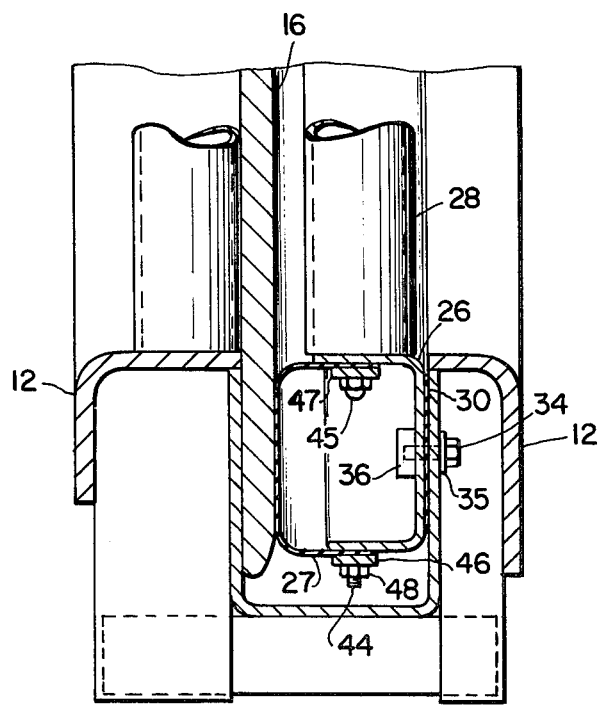
FIG. 9 is an enlarged cross-sectional view, along the line 9—9, of the lower horizontal members of the main and small frames of the apparatus depicted in FIG. 6, with the sealing ring inflated.

Smaller frame 26 is sized to fit inside the channel formed by members 11, 12, and 13 of main frame 10. As best seen in FIGS. 7, 8, and 9, a ring 27 of flexible, durable material, such as a laminated fabric of heat resistant rubber, with wire or fabric reinforcement, is bolted to frame 26. Frame 26 is U-shaped in cross-section. Ring 27 is fastened over the mouth of the U to form an air-tight chamber. The ring is held in place by two concentric rows of outwardly projecting, threaded studs, 44 and 54, that are welded to frame 26. Studs 44 and 54 pass through holes (not shown) near the edges of sealing ring 27. Ring 27 is held in place by segmented hoops 46 and 47, which also have holes (not shown) to allow the hoops to fit over the studs, and by hex nuts 48 and acorn nuts 45. Acorn nuts 45 are used to minimize abrasion of the inner surface of sealing ring 27 when it is collapsed, as shown in FIG. 8.

A pair of upright tubes 28 is welded inside frame 26 to give it added support and to help guide blade 16. Guide members 29, welded to the bottom member of frame 26, assure that blade 16 is properly seated when in the closed position. A rubber gasket 30 is carried by small frame 26 to effect an air-tight seal between frames 26 and 10 when the damper is completely assembled. (see FIGS. 3, 7, 8, and 9.) Access panels 50, 51, 52, and 53 permit inspection of the damper after it is installed.

To install the damper, main frame 10 is first bolted to the conduit (not shown). Then, as shown in FIG. 5, smaller frame 26 is connected to blade 16 by tie rods 31, which are threaded at both ends. Rods 31 are held to frame 26 by cap nuts 32, which are welded to the top member of the frame. At their opposite ends, rods 31 extend through holes in shelf member 33 and are held to the shelf member by nuts 34. Shelf member 33 is welded to blade 16. Before lowering small frame 26 into place, the chamber behind ring 27 is evacuated by means not shown, causing ring 27 to collapse, as illustrated in FIG. 8.

While ring 27 remains deflated, blade 16 is moved to its closed position, causing frame 26 to be lowered into the channel formed by members 11, 12, and 13 of main frame 10. When the opening in frame 16 is aligned with the opening in main frame 10, the two frames are bolted together by a series of bolts 34, as seen in FIGS. 8, 9, and 10. Each bolt 34 is fitted with a washer 35 and is held in place by a cap nut 36 which is welded to the inside wall of frame 26. (Alternatively, and not shown in the drawings, smaller frame 26 can be equipped with threaded studs that are welded to the frame and protrude through main frame 10.) After frames 26 and 10 are bolted together tie rods 31 are removed, allowing blade 16 to move independently of frame 26. A T-nozzle 37 (shown schematically in FIGS. 2, 5 and 6) is connected to the chamber behind ring 27. The two arms of T-nozzle 37 are connected as indicated to sources of vacuum and air pressure (not shown). (Whereas the drawings show nozzle 37 located on the side of frame 10, it may be preferred to locate it at the bottom of the frame.)

To complete the installation of the damper, two lengths of double thickness sealing strips, 39 and 40, are bolted in place along the opposite sides of opening 15 in main frame 10. (See FIG. 7.) Sealing strips 40 are carried by cover plate 41, which is bolted to upper horizontal member 14 of main frame 10.

After the damper has been installed, whenever blade 16 is to be moved, sealing ring 27 must first be deflated (as shown in FIG. 8) so that it will not be damaged. After the movement of the blade is complete—either to the open position or the closed position—ring 27 is reinflated, as shown in FIGS. 7 and 9, for example to a pressure of about 5 to 10 p.s.i. In the closed position, sealing ring 27 prevents gases from leaking past the edges of blade 16 and escaping either to the low pressure side of the conduit or to the atmosphere. Typically, the damper will be oriented in the conduit so that the sealing ring 27 is on the high pressure side of blade 16. When the damper is open, as shown in FIG. 7, inflated sealing ring 27 closes opening 15 in main frame 10 and prevents the escape of any gases to the atmosphere. Strips 39 and 40 provide back-up sealing of opening 15 and reduce atmospheric leakage when blade 16 is in movement.

When it comes time to service sealing ring 27, it and frame 26, to which the ring is bolted, can be removed as a unit from main frame 10 without disconnecting the damper from the conduit and without need for entering the conduit. The only preparation required before removal is as follows: removal of sealing strips 39 and 40 and cover plate 41 from main frame 10; reattachment of connecting rods 31 to shelf member 33 and frame 26; backing out of bolts 34 from nuts 36; deflating sealing ring 27; and disconnecting T-nozzle 37. Blade 16 then can be raised, causing frame 26 to be lifted with it. Ideally, a replacement frame-and-sealing ring unit will be on hand at all times, so that a new unit can be installed in the damper immediately.

By virtue of the present invention, the time required to inspect, repair, or renew an inflatable sealing ring in a sliding blade closure apparatus of the type disclosed is shortened considerably, without any workers having to enter the conduit.

We claim:

1. In a conduit closure apparatus comprising a main frame adapted for connection to a conduit in a position generally in registry with the conduit, a movable blade slidably mounted in the frame, means for moving the blade back and forth between an open position in which the blade is outside the conduit and a closed position in which the blade blocks the conduit, a slot-like port in the frame through which the blade slides when it is moved between its open and closed positions, an inflatable sealing ring that is operable, when inflated, to press against the face of the blade around the blade's periphery when the blade is in the closed position, thereby creating a seal between the blade and the frame, and means for inflating said ring, the IMPROVEMENT wherein the main frame defines a channel which holds the edges of the blade when in the closed position, and the sealing ring is carried by a second frame, smaller than the main frame, which slidably fits in the channel of the main frame, alongside the blade, and which can be withdrawn as a unit from the main frame, through the blade port, for inspection, repair, or replacement of the sealing ring, without having to disconnect the main frame from the conduit.

2. The apparatus of claim 1 additionally including means for releasably tying the smaller frame to the blade, so as to enable the smaller frame to be withdrawn from the main frame by moving the blade to the open position, and to be inserted in the main frame by moving the blade to the closed position.

3. The apparatus of claim 2 additionally including means for releasably fastening the smaller frame to the main frame when the smaller frame is fully inserted in the main frame, said fastening means being controllable from outside the conduit to which the apparatus is connected.

4. The apparatus of claim 3 wherein the main frame, the smaller frame, and the blade are substantially rectangular in shape.

5. The apparatus of claim 4 wherein the means for fastening the two frames together is operable to create a fluid-tight seal between two frames.

6. The apparatus of claim 3 wherein the means for fastening the two frames together is operable to create a fluid-tight seal between the two frames.

7. The apparatus of claim 2 wherein the main frame, the smaller frame, and the blade are substantially rectangular in shape.

8. The apparatus of claim 1 additionally including means for releasably fastening the smaller frame to the main frame when the smaller frame is fully inserted in the main frame, said fastening means being controllable from outside the conduit to which the apparatus is connected.

9. The apparatus of claim 8 wherein the main frame, the smaller frame, and the blade are substantially rectangular in shape.

10. The apparatus of claim 9 wherein the means for fastening the two frames together is operable to create a fluid-tight seal between the two frames.

11. The apparatus of claim 8 wherein the means for fastening the two frames together is operable to create a fluid-tight seal between the two frames.

12. The apparatus of claim 1 wherein the main frame, the smaller frame, and the blade are substantially rectangular in shape.

* * * * *